(12) United States Patent
Gambach et al.

(10) Patent No.: US 9,893,520 B2
(45) Date of Patent: Feb. 13, 2018

(54) SWITCHING DEVICE

(75) Inventors: Herbert Gambach, Uttenreuth (DE);
Gerd Griepentrog, Gutenstetten (DE);
Lutz-Ruediger Jaenicke, Mahlow (DE); Reinhard Maier, Herzogenaurach (DE); Norbert Trapp, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 842 days.

(21) Appl. No.: 14/126,134

(22) PCT Filed: Jun. 4, 2012

(86) PCT No.: PCT/EP2012/060492
§ 371 (c)(1),
(2), (4) Date: Dec. 13, 2013

(87) PCT Pub. No.: WO2012/175319
PCT Pub. Date: Dec. 27, 2012

(65) Prior Publication Data
US 2014/0117776 A1    May 1, 2014

(30) Foreign Application Priority Data
Jun. 24, 2011  (DE) .................. 10 2011 078 034

(51) Int. Cl.
*H02J 1/00*    (2006.01)
*H01H 9/54*    (2006.01)
(Continued)

(52) U.S. Cl.
CPC .............. *H02J 1/00* (2013.01); *H01H 9/541* (2013.01); *H01H 33/596* (2013.01);
(Continued)

(58) Field of Classification Search
CPC .. Y02B 20/202; H05B 41/392; H05B 41/295; H05B 41/2855; H05B 41/34;
(Continued)

(56) References Cited

U.S. PATENT DOCUMENTS 4,685,019 A *  8/1987  Needham ............... H01H 9/548
                                                 218/107
5,410,442 A *  4/1995  Pohl ...................... H01H 89/06
                                                 361/102
(Continued)

FOREIGN PATENT DOCUMENTS

CN    1231077 A    10/1999
DE    2454944 B1    4/1976
(Continued)

*Primary Examiner* — Thienvu Tran
*Assistant Examiner* — Brian K Baxter
(74) *Attorney, Agent, or Firm* — Laurence Greenberg; Werner Stemer; Ralph Locher

(57) ABSTRACT

A switching device for switching bipolar DC currents in a high-voltage system includes at least two electromechanical switching units and a semiconductor switching arrangement. The electromechanical switching units have a first switching status and a second switching status. In the first switching status, the DC current can be passed via at least one of the electromechanical switching units without in this case flowing via the semiconductor switching arrangement. In the second switching status of the electromechanical switching units, the DC current can be passed via the semiconductor switching arrangement and can be switched off.

13 Claims, 3 Drawing Sheets

(51) Int. Cl.
  *H01H 33/59* (2006.01)
  *H02H 3/087* (2006.01)
  *H02H 3/02* (2006.01)

(52) U.S. Cl.
  CPC ............. *H02H 3/087* (2013.01); *H02H 3/025* (2013.01); *Y10T 307/747* (2015.04)

(58) Field of Classification Search
  CPC ............ H05B 33/0803; H05B 33/0809; H05B 41/2325; H05B 41/3925; H05B 41/2828; H05B 41/2827; H05B 41/046; H05B 41/048; H05B 41/28; H01J 1/135; H01H 33/596; H01H 9/541; H01H 9/54; H01H 9/542; H01H 59/0009; H02J 1/00; Y10T 307/747; F16P 3/20; H03K 17/102; H02M 1/088; H02H 7/222; H02H 3/087; H02H 3/025
  USPC ...... 307/113; 361/8; 315/106, 227 R, DIG. 7
  See application file for complete search history.

(56) References Cited

U.S. PATENT DOCUMENTS

| | | | | |
|---|---|---|---|---|
| 5,517,378 | A | 5/1996 | Asplund et al. | |
| 5,528,131 | A * | 6/1996 | Marty | H01H 9/542 323/238 |
| 5,638,038 | A | 6/1997 | Suzuki et al. | |
| 5,793,586 | A * | 8/1998 | Rockot | H01H 33/596 361/8 |
| 5,818,710 | A * | 10/1998 | LeVan Suu | H01H 9/542 340/656 |
| 5,943,223 | A * | 8/1999 | Pond | H02M 1/00 363/15 |
| 7,990,664 | B1 * | 8/2011 | Perisetty | H01L 27/0277 361/111 |
| 2004/0066587 | A1 * | 4/2004 | Schasfoort | H01H 9/542 361/8 |
| 2004/0207359 | A1 * | 10/2004 | Jahkonen | H02M 1/088 318/807 |
| 2005/0122746 | A1 * | 6/2005 | Nagel | H02M 1/088 363/15 |
| 2008/0238214 | A1 * | 10/2008 | Barbosa | H02M 7/483 307/113 |
| 2009/0267154 | A1 * | 10/2009 | Boselli | H01L 27/0259 257/355 |
| 2012/0007657 | A1 * | 1/2012 | Naumann | H01H 9/542 327/434 |
| 2012/0038227 | A1 * | 2/2012 | West | H01H 9/541 307/139 |
| 2012/0299393 | A1 | 11/2012 | Häfner et al. | |

FOREIGN PATENT DOCUMENTS

| | | |
|---|---|---|
| DE | 69408811 T2 | 10/1998 |
| JP | 2003123569 A | 4/2003 |
| WO | 0195355 A1 | 12/2001 |
| WO | 0223573 A1 | 3/2002 |
| WO | 2011057675 A1 | 5/2011 |

* cited by examiner

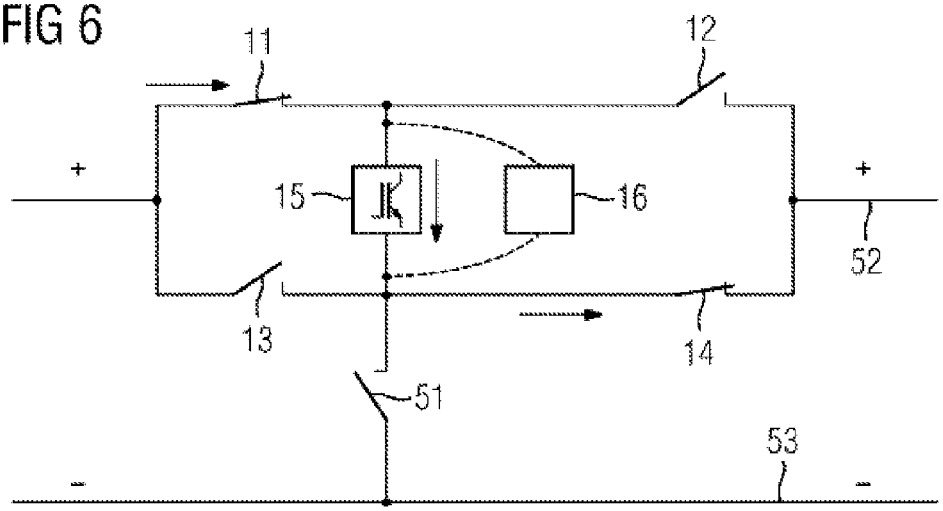
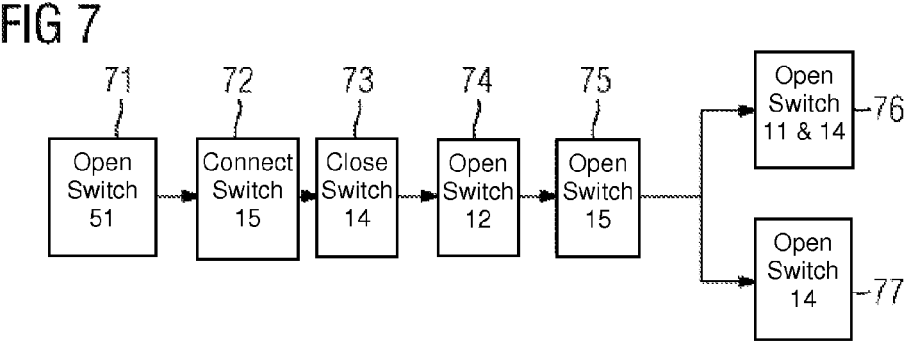
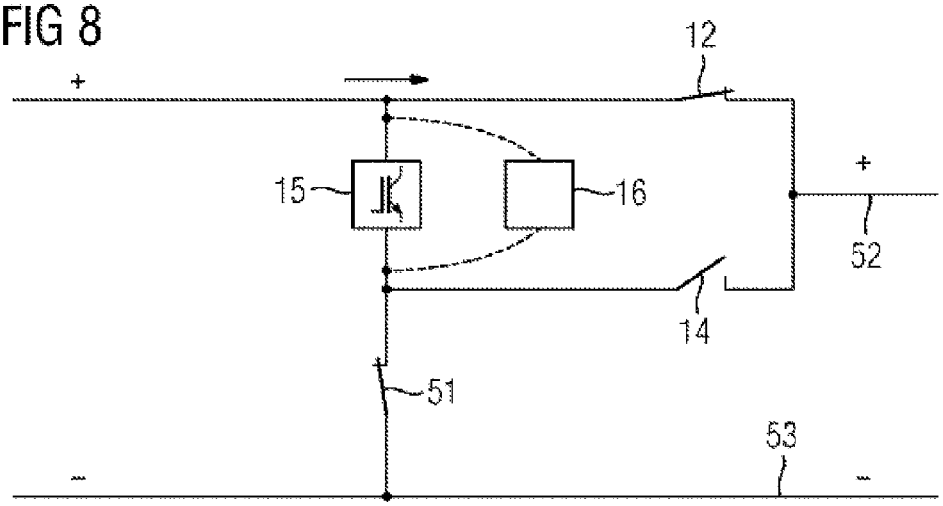

SWITCHING DEVICE

BACKGROUND OF THE INVENTION

Field of the Invention

The invention relates to a switching device for switching bipolar direct currents in high-voltage power supply systems.

Direct currents in high-voltage power supply system's cannot be interrupted with the aid of known switching principles which are based on the current zero crossing of the alternating current. Known concepts for switches for switching bipolar direct currents in high-voltage power supply systems are based on the use of components and subsystems as are used for the high-voltage direct-current converter stations. Said concepts have the disadvantage that the current flows through the disconnect able semiconductor components in the normal operating state and, as a result, non-negligible power losses occur.

BRIEF SUMMARY OF THE INVENTION

The problem addressed by the present invention is to specify a switching device for switching bipolar direct currents in high-voltage power supply systems, which switching device avoids the disadvantage mentioned above.

Said problem is solved by way of a switching device having as claimed. The dependent claims relate to advantageous developments of the invention.

The switching device according to the invention for switching bipolar direct currents in high-voltage power supply systems comprises at least two electromechanical switching units and at least one semiconductor switching arrangement. The aforesaid elements are arranged such that the direct current in a first switching state of the switching device can be conducted via at least one of the electromechanical switching units without in this case flowing via the semiconductor switching arrangement. By contrast, in a second switching state of the device, the current can be conducted via the semiconductor switching arrangement.

The construction according to the invention advantageously leads to a simpler modular construction and reduced manufacturing costs associated therewith. However, it is particularly advantageous for the current in the conducting state not to flow via semiconductor switches with considerable losses but rather to flow via the electromechanical switching unit.

The semiconductor switching arrangement can be designed to conduct current in both directions or only in one direction. However, in order to keep the construction of the semiconductor switching arrangement simple, and therefore to keep the costs low, it is advantageous for the semiconductor switching arrangement to be designed only for current to flow in one direction. Furthermore, the semiconductor switching arrangement can in turn consist of a plurality of semiconductor cells which are able to take up a partial voltage of the DC high voltage. Each of said semiconductor cells in turn can be constructed according to concepts known in and of themselves, such as the concept known as MMC circuit, for example.

The electromechanical switching units are expediently a switch or a combination of switches as are used for switching alternating currents. For this purpose, in particular it is possible to use electromechanical switches, the interruption and isolation properties of which are based on the vacuum switching principle or a switching principle with a quenching and isolating gas.

In a preferred configuration, the switching device comprises a further electromechanical switching unit. The further electromechanical switching unit is switched so as to form a connection between one of the connection points of the semiconductor switching arrangement and the other pole of the DC line. This advantageously makes it possible to supply the semiconductor switching arrangement with a voltage and therefore to keep it operational even when the nominal current flows completely via the electromechanical switching units.

In a further configuration and development of the invention, the switching device has four electromechanical switching units in a full-bridge arrangement or an H-bridge arrangement. In this case, it is expedient for the semiconductor switching arrangement to be switched so as to form a connection between the center points of the two bridge branches. As a result, it is advantageously possible for the semiconductor switching arrangement to be switched to be completely voltage-free after a switch-off process.

The semiconductor switching arrangement preferably comprises an element for taking up the switching energy. As a result, the switching energy to be converted during the switch-off process can be dissipated.

For a disconnection process, for example if there is a short circuit on the DC line, at least one of the electromechanical switching units is opened. In this case, the switches contained in an electromechanical switching unit are expediently opened and the arc voltage arising therefrom causes the commutation of the current onto the semiconductor switching arrangement, which is switched on. As a result, a current zero crossing occurs in the disconnecting electromechanical switching unit and hence the current flow in said electromechanical switching unit is interrupted.

If the electromechanical switching units are arranged in a bridge circuit, for example in each case one electromechanical switching unit of each bridge branch can be used to disconnect the current, wherein the electromechanical switching unit in the first bridge branch is arranged upstream of the semiconductor switching arrangement in the current flow direction and the electromechanical switching unit of the other bridge branch is arranged downstream of the semiconductor switching arrangement in the current flow direction.

After the commutation of the current to the semiconductor switching arrangement, said arrangement is disconnected in a controlled manner. Subsequently, in a development of the invention, the remaining electromechanical switching units can be opened and hence a complete isolation can be achieved.

BRIEF DESCRIPTION OF THE SEVERAL VIEWS OF THE DRAWING

Preferred, but in no way restrictive, exemplary embodiments of the invention will now be explained in greater detail with reference to the figures of the drawing. In this case, the features are illustrated schematically. In the figures:

FIG. 6 shows the second switching device during the disconnection of a current, FIG. 7 shows method steps of the disconnection in the case of the second switching device, and FIG. 8 shows a third switching device having two circuit breakers.

DESCRIPTION OF THE INVENTION

Figure 1:
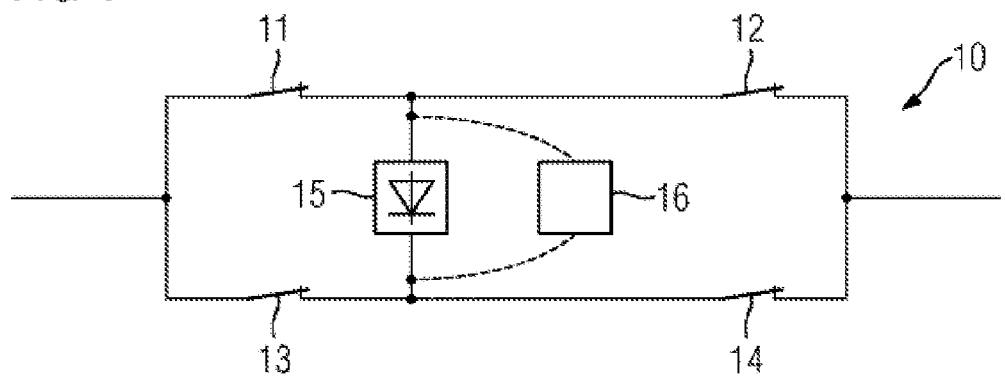
FIG. 1 shows a first switching device with a full-bridge circuit composed of circuit breakers.

FIG. 1 shows a first exemplary embodiment of the invention. The first switching device 10 shown in FIG. 1 has a full-bridge arrangement consisting of a first to fourth circuit breaker 11 . . . 14. In this case, the bridge circuit usually has two parallel branches in which in each case two of the circuit breakers 11 . . . 14 are connected in series. The center between the first and the second circuit breakers 11, 12 is connected to the center between the third and fourth circuit breakers 13, 14 by means of a semiconductor switching arrangement 15. An energy-absorbing element 16 is provided in parallel with the semiconductor switching arrangement 15.

In the present exemplary embodiment, the semiconductor switching arrangement 15 is a series connection of modules, known in and of themselves, of a modular multilevel converter (MMC). The energy-absorbing element 16 is a plurality of high-voltage arresters.

In addition to the basic construction of the first switching device, FIG. 1 at the same time shows said device in a first switching state, which corresponds to the normal operation when current is conducted. For this purpose, all four circuit breakers 11 . . . 14 are closed. In said first switching state, the current can therefore flow unhindered through the two branches of the bridge arrangement. The circuit breakers 11 . . . 14 have a very low resistance. Owing to the wiring, the semiconductor switching arrangement 15 is substantially voltage-free.

Figure 3:
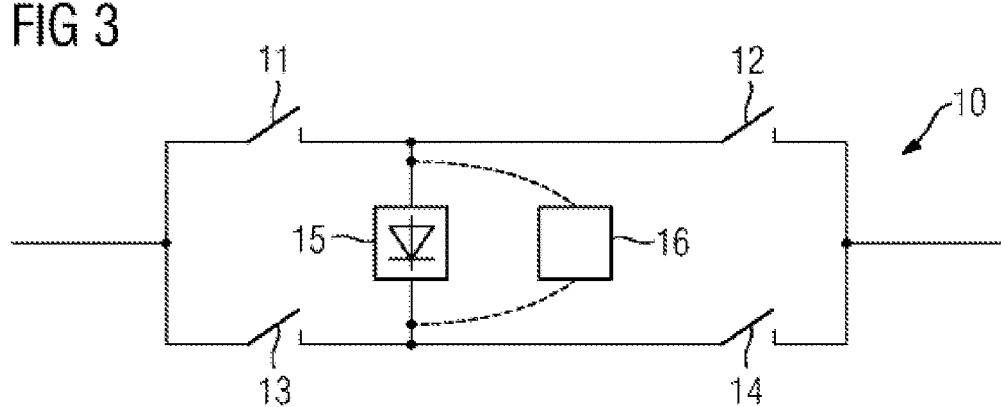
FIG. 3 shows the first switching device after disconnection of the current.
Figure 4:
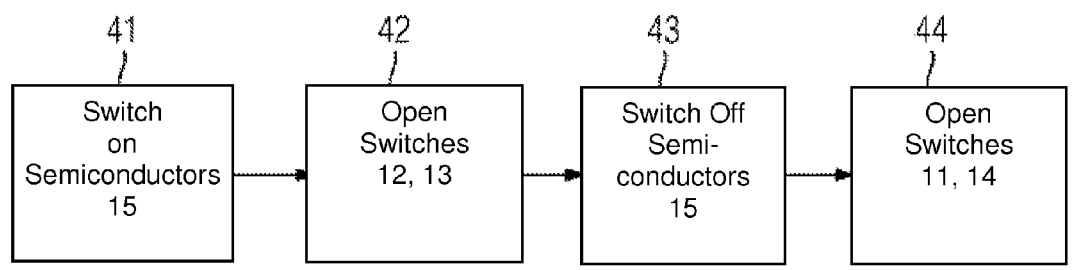
FIG. 4 shows method steps during the disconnection of a current.

The procedure of a switch-off process will be described below with reference to FIGS. 2 to 4. In this case, FIG. 4 shows a first to fourth method step 41 to 44. In the first method step 41, the semiconductor switching arrangement 15 is switched on. It is therefore transferred into the conducting state, but still does not conduct any substantial current since no voltage is applied to it. In the second method step 42, the second power switch 12 and the third power switch 13 are now opened. If a sufficient voltage drop is present across the switching paths of said circuit breakers 12, 13, forcible commutation of the current into the semiconductor switching arrangement 15 occurs and the arcs in the circuit breakers 12, 13 are quenched. The circuit breakers 12, 13 isolate from this instant.

In the third method step 43, the semiconductor switching arrangement 15 is disconnected and the energy stored in the DC circuit is dissipated in the energy-absorbing element 16. In the fourth, optional method step 44, the other two circuit breakers 11, 14 open and hence completely isolate the semiconductor switching arrangement 15 from the DC power supply system. For reconnection, the circuit breakers 11 . . . 14 are switched on, while the semiconductor switching arrangement 15 remains inactive.

Figure 2:
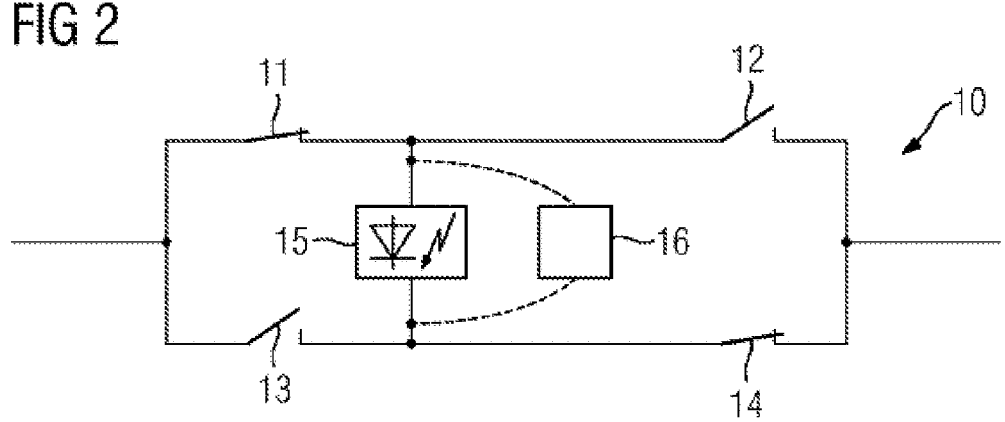
FIG. 2 shows the first switching device during interruption of a current flow.

FIG. 2 shows the state of the first switching device 10 after the second method step 42; FIG. 3 shows the state of the first switching device 10 after the fourth method step 44.

Figure 5:
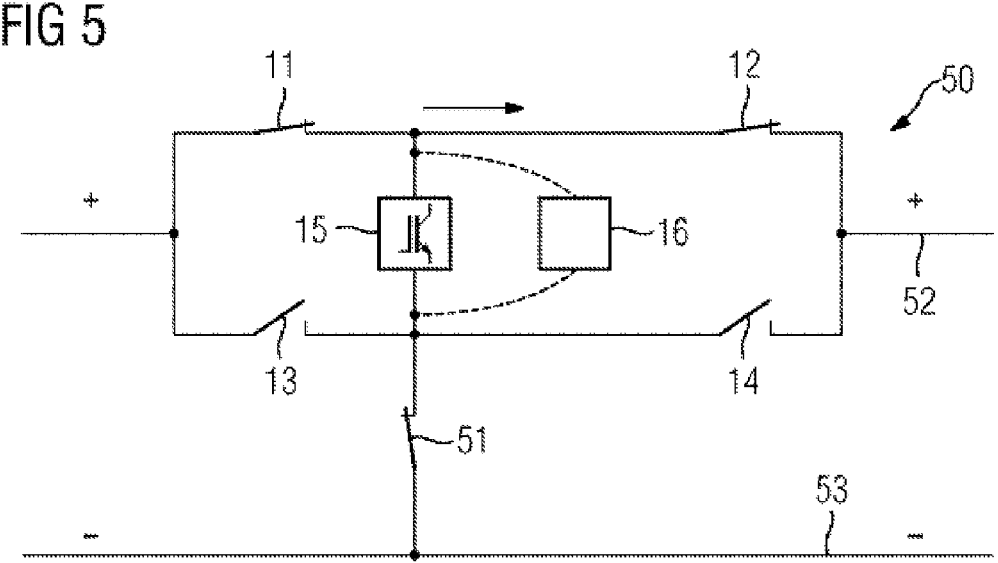
FIG. 5 shows a second switching device during nominal operation.

A second exemplary embodiment in the form of a second switching device 50 is explained with reference to FIGS. 5 to 7. FIG. 5 shows the second switching device 50 in normal operation, that is to say when current is conducted. The second switching device 50 has, analogously to the first switching device 10, a full-bridge arrangement composed of circuit breakers 11 . . . 14. Furthermore, the second switching device 50 has a semiconductor switching arrangement 15 as interconnected in the first switching device 10.

In contrast to the first switching device 10, the second switching device 50 has a further power switch 51. In this case, the further power switch 51 connects a connection point of the semiconductor switching arrangement 15 to the pole which cannot be disconnected by the switching device 50, which is the negative pole in this case.

In normal operation when current is conducted, a switching state as shown in FIG. 5 is set. In this case, as in the case of the first switching device 10, the first and second circuit breakers 11, 12 are closed. In contrast to the first switching device 10, however, the third and fourth circuit breakers 13, 14 are open when current is conducted. However, the further power switch 51 is closed. As a result, the entire power supply system voltage, which is intended to be isolated by means of the two circuit breakers 13, 14, is dropped across the two circuit breakers 13, 14. Thus, the first two circuit breakers 11, 12 conduct the current and the entire voltage is applied to the semiconductor switching arrangement 15. Advantageously, a supply voltage for the actuation of the semiconductor switching arrangement 15 is therefore continuously available. However, as in the case of the first switching device 10, substantially no current flows via the semiconductor switching arrangement 15 apart from the current required to cover the individual energy demand, since the semiconductor switching arrangement is in the voltage-free state. Thus, the losses are low.

By way of example, in the event of a detected short circuit, a disconnection process is then initiated. FIG. 7 shows a first to seventh disconnection step 71 to 77 for this purpose.

In the first disconnection step 71, the further power switch 51 is opened in order to isolate the semiconductor switching arrangement 15 from the negative pole. It is expedient for the semiconductor switching arrangement 15 in this case to be transferred into a switched-off state with the result that it can build up the entire power supply system voltage and the current through the semiconductor switching arrangement 15 tends toward zero. Then the further power switch 51 can be opened in a current- and voltage-free manner.

It is assumed in the description of the further switching processes that the load or short-circuit current to be disconnected flows from the first power switch 11 to the second power switch 12. For a reversed current flow direction, the switching processes must correspondingly be reversed, that is to say the complementary circuit breakers must then be activated for this purpose.

As soon as the further power switch 51 has reached a position in which it can isolate the entire voltage, the semiconductor switching arrangement 15 is actuated, in the second disconnection step 72, in such a way that it becomes conducting and hence the terminal voltage thereof becomes zero. Therefore, the entire power supply system voltage is dropped across the further power switch 51. Subsequently, in the third disconnection step 73, the fourth power switch 14 closes. After the fourth power switch 14 has been closed, the second power switch 12 is opened in the fourth disconnection step 74. As a result, the second power switch 12 builds up an arc voltage which causes the commutation of the current from said circuit breaker onto the semiconductor switching arrangement 15 and the fourth power switch 14. The arc in the second power switch 12 quenches and the second power switch 12 isolates as a result. As a result, a switching state as illustrated in FIG. 6 is achieved.

In the subsequent fifth disconnection step 75, analogously to the first switching device 10, the semiconductor switching arrangement 15 is now disconnected in a controlled manner and the energy stored in the DC circuit is dissipated in the energy-absorbing element 16. For this purpose, "disconnected in a controlled manner" means that the semiconductor switching arrangement 15 builds up voltage in a well defined way and thus reduces the current to be disconnected in a previously defined way. In the present example, owing to the series connection, the disconnection can take place in fine steps. Moreover, the disconnection takes place in a regulated manner, that is to say the control unit checks both the current to be disconnected and the feedback from the DC power supply system during the disconnection and reacts thereto.

Optionally, in a sixth disconnection step 76, all of the remaining circuit breakers 11, 14 can then be opened and thus the entire switching device 50 is shut down.

Alternatively, it is also possible in a seventh disconnection step 77 to open only the fourth power switch 14 without current but to leave the first power switch 11 closed. By closure of the further power switch 51, the semiconductor switching arrangement 15 has a voltage applied to it again and thus, in the seventh disconnection step 77, the arrangement is again transferred into a state in which it is ready to be switched on again. To switch on, only the second power switch 12 is closed while the semiconductor switching arrangement 15 remains inactive.

The described principle works in both current flow directions. Furthermore, the principle can also be correspondingly applied to the negative pole of an HVDC line.

A third exemplary embodiment in the form of a third switching device 80 is described with reference to FIG. 8. The third switching device 80 is constructed in a simplified way in comparison with the first two switching devices 10, 50. Here, it is presupposed that both the nominal current to be disconnected and the short-circuit current to be disconnected can only ever flow in one direction, in this case in the direction illustrated in FIG. 8 by the arrow. In this case, the third switching device 80 is developed from the second switching device 50 by the first and third circuit breakers 11, 13 being omitted. Here, the first power switch 11 is replaced by a direct electrical connection while the electrical connection via the third power switch 13 is completely removed.

FIG. 8 shows the third switching device 80 during conducting normal operation. Here, too, the current flows via a power switch during conducting normal operation, in this case the second power switch 12, which is closed. The fourth power switch 14 is open. The further power switch 51 is closed during conducting normal operation. The disconnection process takes place in the same way as in the case of the second switching device 50, although a complete isolation of the semiconductor switching arrangement 15 is not possible in this case and is not performed. Therefore, for disconnection in the case of the third switching device 80, the first to fifth disconnection steps 71 . . . 75 and the seventh disconnection step 77 are performed.

In a possible alternative configuration of the third switching device 80, the first power switch 11 is retained, which enables a complete isolation of the semiconductor switching arrangement 15 in the sixth disconnection step 76.

The invention claimed is:

1. A switching device for switching bipolar direct currents in a DC line of a high-voltage power supply system, comprising:
   at least two electromechanical switching units having a first switching state and a second switching state; and
   a semiconductor switching arrangement including a series connection of semiconductor cells;
   said at least two electromechanical switching units and said semiconductor switching arrangement being connected such that, in the first switching state of the at least two electromechanical switching units, direct current is conducted via at least one of said at least two electromechanical switching units and without flowing through said semiconductor switching arrangement, and, in the second switching state of the at least two electromechanical switching units, the direct current is conducted via said semiconductor switching arrangement for switching off the direct current; and
   said at least two electromechanical switching units connected in the DC line.

2. The switching device according to claim 1, wherein said semiconductor switching arrangement has a first node connected to a first pole of the DC line and a second node connected to a second pole of the DC line, and further comprising a further electromechanical switching unit disposed to form a connection between said first node of said semiconductor switching arrangement and the second pole of the DC line.

3. The switching device according to claim 1, wherein said at least two electromechanical switching units are four electromechanical switching units in a full-bridge arrangement.

4. The switching device according to claim 3, wherein said semiconductor switching arrangement is switched to form a connection between center points of two bridge branches of said full-bridge arrangement.

5. The switching device according to claim 1, wherein said semiconductor switching arrangement comprises an element for taking up switching energy during a disconnection process.

6. The switching device according to claim 1, wherein said semiconductor cells are configured to take up in each case a partial voltage of a high voltage present across the switching device.

7. The switching device according to claim 1, wherein each of said electromechanical switching units comprises a combination of a plurality of switches for switching alternating currents.

8. The switching device according to claim 1, configured for opening at least one of said electromechanical switching units to disconnect the current, thus causing a commutation of the current onto said semiconductor switching arrangement.

9. The switching device according to claim 8, wherein, following the commutation of the current to said semiconductor switching arrangement, said semiconductor switching arrangement is disconnected.

10. The switching device according to claim 8, wherein, following the disconnection of the current, the remaining said electromechanical switching units are opened.

11. The switching device according to claim 1, which comprises one or more high-voltage arresters for taking up switching energy during a disconnection process.

12. The switching device according to claim 1, wherein said semiconductor cells are modular multilevel converters.

13. The switching device according to claim 1, further comprising: at least one energy absorbing element for dissipating energy stored in the switching device; said at least one energy absorbing element connected in parallel with said semiconductor switching arrangement.

* * * * *